US012767838B2

(12) United States Patent
Kim et al.

(10) Patent No.: US 12,767,838 B2
(45) Date of Patent: Oct. 20, 2026

(54) INK COMPOSITION, LAYER USING SAME, AND ELECTROPHORESIS DEVICE AND DISPLAY DEVICE COMPRISING SAME

(71) Applicant: SAMSUNG SDI CO., LTD., Yongin-si (KR)

(72) Inventors: Kyuyoung Kim, Suwon-si (KR); Dong Wan Ryu, Suwon-si (KR); Misun Kim, Suwon-si (KR); Janghyuk Kim, Suwon-si (KR); Eun Sun Yu, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 467 days.

(21) Appl. No.: 18/282,194

(22) PCT Filed: Apr. 21, 2022

(86) PCT No.: PCT/KR2022/005684
§ 371 (c)(1),
(2) Date: Sep. 14, 2023

(87) PCT Pub. No.: WO2022/239991
PCT Pub. Date: Nov. 17, 2022

(65) Prior Publication Data

US 2024/0182728 A1 Jun. 6, 2024

(30) Foreign Application Priority Data

May 11, 2021 (KR) ........................ 10-2021-0060890

(51) Int. Cl.
*C09D 11/033* (2014.01)
*C08K 7/00* (2006.01)
(Continued)

(52) U.S. Cl.
CPC .............. *C09D 11/033* (2013.01); *C08K 7/00* (2013.01); *C08K 9/02* (2013.01); *C09D 5/448* (2013.01);
(Continued)

(58) Field of Classification Search
CPC ........ C09D 11/30; C09D 11/52; C09D 11/033
See application file for complete search history.

(56) References Cited

U.S. PATENT DOCUMENTS 6,187,086 B1 2/2001 Rehman
7,381,625 B2 6/2008 Xi et al.
(Continued)

FOREIGN PATENT DOCUMENTS

CN 1506153 A 6/2004
CN 1892396 A 1/2007
(Continued)

OTHER PUBLICATIONS

Restriction Requirement dated Jan. 14, 2026, issued in U.S. Appl. No. 18/282,190 (9 pages).
(Continued)

*Primary Examiner* — Khanh T Nguyen
(74) *Attorney, Agent, or Firm* — Womble Bond Dickinson (US) LLP

(57) ABSTRACT

Provided are an ink composition including (A) semiconductor nanorods; and (B) a mixed solvent including a first solvent including a compound represented by Chemical Formula 1 and a second solvent including a compound represented by Chemical Formula 2, a layer manufactured using the ink composition, and an electrophoresis device, and a display device including the same. The definition of Chemical Formula 1 and Chemical Formula 2 is the same as the specification.

17 Claims, 1 Drawing Sheet

(51) Int. Cl.
*C08K 9/02* (2006.01)
*C09D 5/44* (2006.01)
*C08K 3/28* (2006.01)

(52) U.S. Cl.
CPC .. *C08K 2003/282* (2013.01); *C08K 2201/011* (2013.01)

(56) References Cited

U.S. PATENT DOCUMENTS

| | | | |
|---|---|---|---|
| 7,407,894 B2 | 8/2008 | Kobayashi et al. | |
| 7,851,841 B2 | 12/2010 | Duan et al. | |
| 8,629,422 B2 | 1/2014 | Ryan et al. | |
| 8,765,014 B2 | 7/2014 | Cho et al. | |
| 9,018,081 B2 | 4/2015 | Crowder | |
| 11,597,848 B2 | 3/2023 | Sim et al. | |
| 2006/0110896 A1 | 5/2006 | Kobayashi et al. | |
| 2006/0145163 A1 | 7/2006 | Tsujimura et al. | |
| 2007/0002428 A1 | 1/2007 | Liu et al. | |
| 2007/0244220 A1 | 10/2007 | Kim et al. | |
| 2008/0087190 A1* | 4/2008 | Iftime | C09D 11/34 252/301.36 |
| 2008/0315229 A1 | 12/2008 | Yi et al. | |
| 2009/0264317 A1 | 10/2009 | Ofir et al. | |
| 2009/0268274 A1 | 10/2009 | Masuzawa et al. | |
| 2009/0314991 A1 | 12/2009 | Cho et al. | |
| 2010/0033802 A1 | 2/2010 | Roh | |
| 2012/0006686 A1 | 1/2012 | Furman et al. | |
| 2014/0021400 A1 | 1/2014 | Coenjarts | |
| 2014/0048749 A1 | 2/2014 | Lockett et al. | |
| 2014/0051237 A1 | 2/2014 | Lockett et al. | |
| 2014/0352576 A1* | 12/2014 | Morimitsu | C09D 11/34 106/316 |
| 2014/0364548 A1 | 12/2014 | Everhardus et al. | |
| 2014/0364640 A1 | 12/2014 | Rosier | |
| 2015/0109659 A1 | 4/2015 | Yoo et al. | |
| 2015/0115235 A1 | 4/2015 | Lee et al. | |
| 2015/0122335 A1 | 5/2015 | Yoon et al. | |
| 2015/0349206 A1 | 12/2015 | Lowenthal et al. | |
| 2015/0378235 A1 | 12/2015 | Lin et al. | |
| 2016/0293783 A1 | 10/2016 | Shiomi et al. | |
| 2018/0175254 A1 | 6/2018 | Chung et al. | |
| 2018/0230321 A1 | 8/2018 | Pan et al. | |
| 2019/0112523 A1 | 4/2019 | Kim et al. | |
| 2019/0177615 A1 | 6/2019 | Qu et al. | |
| 2019/0218453 A1 | 7/2019 | Qiu et al. | |
| 2019/0258098 A1 | 8/2019 | Oba | |
| 2019/0375957 A1 | 12/2019 | Hasegawa et al. | |
| 2019/0390076 A1 | 12/2019 | Isonaka et al. | |
| 2020/0017704 A1* | 1/2020 | Yang | C09D 11/322 |
| 2021/0098202 A1 | 4/2021 | Noh et al. | |
| 2021/0395545 A1 | 12/2021 | Marcaccioli | |
| 2022/0177777 A1 | 6/2022 | Loiudice et al. | |
| 2023/0227994 A1 | 7/2023 | Youn et al. | |
| 2023/0407124 A1 | 12/2023 | Kim et al. | |
| 2024/0052190 A1 | 2/2024 | Youn et al. | |
| 2024/0352270 A1 | 10/2024 | Jeong et al. | |
| 2025/0026948 A1 | 1/2025 | Youn et al. | |

FOREIGN PATENT DOCUMENTS

| | | | | |
|---|---|---|---|---|
| CN | 1977221 | A | 6/2007 | |
| CN | 101542383 | A | 9/2009 | |
| CN | 103666071 | A | 3/2014 | |
| CN | 103756412 | A | 4/2014 | |
| CN | 104766932 | A | 7/2015 | |
| CN | 105062193 | A | 11/2015 | |
| CN | 107430301 | A | 12/2017 | |
| CN | 108439457 | A | 8/2018 | |
| CN | 108864823 | A | 11/2018 | |
| CN | 109652076 | A | 4/2019 | |
| CN | 110038637 | A | 7/2019 | |
| CN | 110607094 | A | 12/2019 | |
| DE | 10131486 | A1 | 10/2002 | |
| EP | 2559741 | A2 | 2/2013 | |
| JP | 2005-523231 | A | 8/2005 | |
| JP | 2007-011342 | A | 1/2007 | |
| JP | 2008-152211 | A | 7/2008 | |
| JP | 4215158 | B2 | 1/2009 | |
| JP | 2010-24297 | A | 2/2010 | |
| JP | 2010-265420 | A | 11/2010 | |
| JP | 2012-167236 | A | 9/2012 | |
| JP | 2014162966 | A * | 9/2014 | B22F 7/04 |
| JP | 5635018 | B2 | 12/2014 | |
| JP | 2015-201510 | A | 11/2015 | |
| JP | 2017-037761 | A | 2/2017 | |
| JP | 6328031 | B2 | 5/2018 | |
| JP | 6330123 | B2 | 5/2018 | |
| JP | 2019-056154 | A | 4/2019 | |
| JP | 2019-512720 | A | 5/2019 | |
| JP | 6639170 | B2 | 2/2020 | |
| JP | 6688403 | B2 | 4/2020 | |
| KR | 10-0757103 | B1 | 9/2007 | |
| KR | 10-2007-0099778 | A | 10/2007 | |
| KR | 10-2007-0113692 | A | 11/2007 | |
| KR | 10-0860446 | B1 | 9/2008 | |
| KR | 10-2009-0011033 | A | 1/2009 | |
| KR | 10-2009-0056967 | A | 6/2009 | |
| KR | 10-2009-0078099 | A | 7/2009 | |
| KR | 10-2010-0019818 | A | 2/2010 | |
| KR | 10-2010-0032098 | A | 3/2010 | |
| KR | 10-0958920 | B1 | 5/2010 | |
| KR | 10-1193175 | B1 | 10/2012 | |
| KR | 10-1195078 | B1 | 10/2012 | |
| KR | 10-2013-0074598 | A | 7/2013 | |
| KR | 10-2013-0078194 | A | 7/2013 | |
| KR | 10-2014-0000735 | A | 1/2014 | |
| KR | 10-2014-0143088 | A | 12/2014 | |
| KR | 10-2015-0010591 | A | 1/2015 | |
| KR | 10-2015-0123529 | A | 11/2015 | |
| KR | 10-2017-0032315 | A | 3/2017 | |
| KR | 10-2018-0021870 | A | 3/2018 | |
| KR | 10-2018-0039784 | A | 4/2018 | |
| KR | 10-2019-0041430 | A | 4/2019 | |
| KR | 10-1967035 | B1 | 4/2019 | |
| KR | 10-1971045 | B1 | 4/2019 | |
| KR | 10-2020-0056065 | A | 5/2020 | |
| KR | 10-2020-0122430 | A | 10/2020 | |
| KR | 10-2237001 | B1 | 4/2021 | |
| KR | 10-2021-0109079 | A | 9/2021 | |
| KR | 10-2021-0114761 | A | 9/2021 | |
| KR | 10-2021-0133044 | A | 11/2021 | |
| KR | 10-2022-0058216 | A | 5/2022 | |
| TW | 200417805 | A | 9/2004 | |
| TW | 202030279 | A | 8/2020 | |
| WO | WO 2004-022483 | A1 | 3/2004 | |
| WO | WO 2010-104606 | A1 | 9/2010 | |
| WO | WO 2016-009431 | A1 | 1/2016 | |
| WO | 2017/080324 | A1 | 5/2017 | |
| WO | WO 2017/153666 | A1 | 9/2017 | |
| WO | WO 2018/049158 | | 3/2018 | |
| WO | WO 2018/123103 | A1 | 7/2018 | |
| WO | 2021/075741 | A1 | 4/2021 | |

OTHER PUBLICATIONS

International Search Report for corresponding Application No. PCT/KR2022/005684 dated Aug. 1, 2022, 5pp.

US Office Action dated Jun. 30, 2025, issued in U.S. Appl. No. 18/282,199 (8 pages).

Latzel, Michael, et al. "Significant performance enhancement of InGaN/GaN nanorod LEDs with multi-layer graphene transparent electrodes by alumina surface passivation." Nanotechnology, Purpose-Led Publishing (2017) 8 pages.

US Final Office Action dated Oct. 1, 2025, issued in U.S. Appl. No. 18/002,426 (13 pages).

International Search Report for corresponding Application No. PCT/KR2022/005686 dated Aug. 4, 2022, 6pp.

International Search Report of PCT/KR2021/006339, Aug. 25, 2021, 5 pp.

Herrera, et al., "Triethyl Citrate (TEC) as a Dispersing Aid in Polylactic Acid/Chitin Nanocomposites Prepared via Liquid-Assisted Extrusion," Polymers, 2017, vol. 9, No. 406, pp. 1-16.

(56) References Cited

OTHER PUBLICATIONS

International Search Report of PCT/KR2021/004315, Jul. 9, 2021, 4 pp.
International Search Report for corresponding Application No. PCT/KR2022/003761 dated Jun. 22, 2022, 4pp.
Korean Office Action dated Apr. 15, 2024, issued in Korean Patent Application No. 10-2020-0143749, 6 pages.
Sun, Chun, et al., "Efficient and Stable White LEDs with Silica-Coated Inorganic Perovskite Quantum Dots," Advanced Materials, 2016, vol. 28, pp. 10088-10094.
Yin, B., et al., "Quantum dots protected from oxidative attack using alumina shells synthesized by atomic layer deposition," Chem. Commun., The Royal Society of Chemistry, 2016, vol. 52, pp. 11127-11130.
Min, Guo, et al., "Progress in Well-aligned Nanowire/rod/tube Array Materials," China Academic Journal, Dec. 2006, 9 pages.
Chinese Office Action dated Oct. 24, 2022, issued in corresponding Chinese Patent Application No. 202180007495.9 (8 pages).
Bao, K. et al., "Controlled Synthesis of GaN@$SiO_2$ Particles in Preventing the Hydrolysis of GaN", The Journal of Physical Chemistry, May 26, 2011, 13200-13206.
US Office Action dated Jun. 20, 2024, issued in U.S. Appl. No. 18/336,350 (12 pages).
English translation of previously submitted KR 10-2014-0000735 A (Year: 2025), 17 pages.
Chinese Office Action corresponding to CN Application No. 202280030635.9, dated Apr. 9, 2025, 11 pages.
Chinese Office Action corresponding to CN Application No. 202280029829.7, dated Apr. 10, 2025, 8 pages.
US Office Action dated May 21, 2025, issued in U.S. Appl. No. 17/905,903 (9 pages).
US Final Office Action dated Nov. 6, 2025, issued in U.S. Appl. No. 17/905,903 (9 pages).
Chinese Office Action dated Feb. 22, 2025, issued in Chinese Patent Application No. 202280026474.6, 7 pages.
US Restriction Requirement dated Jan. 29, 2025, issued in U.S. Appl. No. 18/282,199, 9 pages.
US Notice of Allowance dated Mar. 27, 2026, issued in U.S. Appl. No. 17/905,903 (9 pages).
US Office Action dated May 14, 2026, issued in U.S. Appl. No. 18/282,190 (7 pages).

* cited by examiner

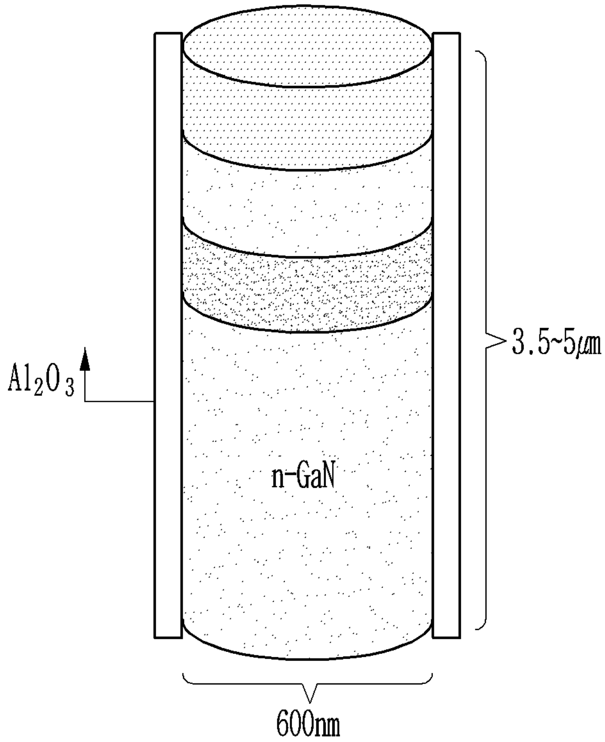
$Al_2O_3$
n-GaN
3.5~5µm
600nm

INK COMPOSITION, LAYER USING SAME, AND ELECTROPHORESIS DEVICE AND DISPLAY DEVICE COMPRISING SAME

CROSS-REFERENCE TO RELATED APPLICATIONS

This application is a U.S. National Phase Patent Application of International Application Number PCT/KR2022/005684, filed on Apr. 21, 2022, which claims priority to Korean Patent Application Number 10-2021-0060890, filed on May 11, 2021, the entire content of each of which is incorporated herein by reference.

TECHNICAL FIELD

This disclosure relates to an ink composition, a layer using the same, and an electrophoresis device and a display device including the same.

BACKGROUND ART

LEDs have been actively developed since 1992 when Nakamura and others from Japanese Nichia Corp. succeeded in fusing a high-quality single crystal GaN nitride semiconductor by applying a low temperature GaN compound buffer layer. LED is a semiconductor device converting electric signals into light having wavelengths in a desired region by using characteristics of a compound semiconductor, which has a structure that an n-type semiconductor crystal in which a plurality of carriers is electrons and a p-type semiconductor crystal in which a plurality of carriers is holes are combined to each other.

This LED semiconductor has high light conversion efficiency and thus consumes very little energy and has a semi-permanent life-span and also, is environmentally-friendly and thus called to be a revolution of light as a green material. Recently, high luminance red, orange, green, blue, and white LEDs have been developed with the development of compound semiconductor technology and are being applied in many fields such as traffic lights, mobile phones, car headlights, outdoor billboards, LCD BLU (back light unit), and indoor/outdoor lighting, which keeps being actively researched at home and abroad. Particularly, a GaN-based compound semiconductor having a wide band-gap is a material used to manufacture a LED semiconductor emitting light in green, blue, and ultraviolet (UV) regions, and since a blue LED device is used to manufacture a white LED device, lots of research is being made on this.

Among these series of studies, studies using ultra-small LED devices having a nano or micro unit size are being actively conducted, and in addition studies for utilizing these ultra-small LED devices in lighting and displays are being continuously made. In these studies, electrodes capable of applying power to the ultra-small LED devices, disposition of the electrodes for reducing a space occupied by the electrodes, a method of mounting the ultra-small LED devices on the disposed electrodes, and the like are continuously attracting attentions.

Among these, the method of mounting the ultra-small LED devices on the disposed electrodes still have difficulties of disposing and mounting the ultra-small LED devices on the electrodes as intended due to size limitations of the ultra-small LED devices. The reason is that the ultra-small LED devices are nano-scale or micro-scale and thus may not be one by one disposed and mounted by hand on a target electrode region.

Recently, as the demand for the nano-scale ultra-small LED devices is increasing, an attempt to manufacture a nano-scale GaN-based or InGaN-based compound semiconductor into a rod has been made, but the dispersion stability of the nanorods itself in the solvent (or polymerizable compound) may be greatly reduced. And, until now, there has been no introduction of a technology capable of improving dispersion stability of semiconductor nanorods in a solvent (or polymerizable compound). Therefore, research on a curable composition including semiconductor nanorods capable of improving dispersion stability of semiconductor nanorods in a solvent (or polymerizable compound) and realizing high dielectrophoresis rate continues.

DISCLOSURE

Technical Problem

An embodiment provides an ink composition having excellent dielectrophoretic properties and storage stability of semiconductor nanorods.

Another embodiment provides a layer manufactured using the ink composition.

Another embodiment provides an electrophoresis device and a display device including the layer.

Technical Solution

An embodiment provides an ink composition including (A) semiconductor nanorods; and (B) a mixed solvent including a first solvent including a compound represented by Chemical Formula 1 and a second solvent including a compound represented by Chemical Formula 2.

[Chemical Formula 1]

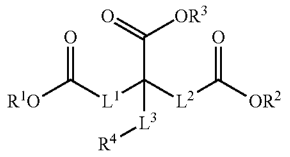

In Chemical Formula 1, $R^1$ to $R^3$ are each independently a hydrogen atom or a C1 to C10 alkyl group, $R^4$ is a hydrogen atom or *—C(=O)$R^5$, wherein $R^5$ is a C1 to C10 alkyl group, $L^1$ and $L^2$ are each independently a substituted or unsubstituted C1 to C20 alkylene group or a substituted or unsubstituted C6 to C20 arylene group, and $L^3$ is *—O—*, *—S—*, or *—NH—*,

[Chemical Formula 2]

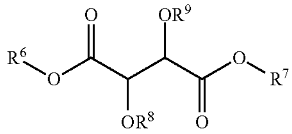

wherein, in Chemical Formula 2, $R^6$ and $R^7$ are each independently a hydrogen atom, a substituted or unsubstituted C1 to C20 alkyl group, a substituted or unsubstituted C3 to C20 cycloalkyl group, or a substituted or unsubstituted C6 to C20 aryl group, and $R^8$ and $R^9$ are each independently a hydrogen atom or *—(C═O)$R^{10}$, wherein $R^{10}$ is a substituted or unsubstituted C1 to C20 alkyl group, a substituted or unsubstituted C3 to C20 cycloalkyl group, or a substituted or unsubstituted C6 to C20 aryl group.

Chemical Formula 2 may be represented by Chemical Formula 2A.

[Chemical Formula 2A]

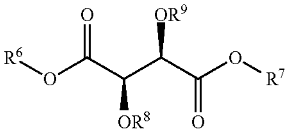

In Chemical Formula 2A, $R^6$ and $R^7$ are each independently a hydrogen atom, a substituted or unsubstituted C1 to C20 alkyl group, a substituted or unsubstituted C3 to C20 cycloalkyl group, or a substituted or unsubstituted C6 to C20 aryl group, and $R^8$ and $R^9$ are each independently a hydrogen atom or *—(C═O)$R^{10}$, wherein $R^{10}$ is a substituted or unsubstituted C1 to C20 alkyl group, a substituted or unsubstituted C3 to C20 cycloalkyl group, or a substituted or unsubstituted C6 to C20 aryl group.

In Chemical Formula 2 or Chemical Formula 2A, $R^8$ and $R^9$ may each independently be a hydrogen atom.

In Chemical Formula 2 or Chemical Formula 2A, $R^6$ and $R^7$ may each independently be a hydrogen atom.

The compound represented by Chemical Formula 2 may include a compound represented by any one of Chemical Formula 2-1 to Chemical Formula 2-4.

[Chemical Formula 2-1]

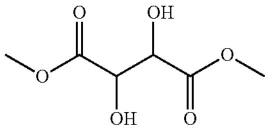

[Chemical Formula 2-2]

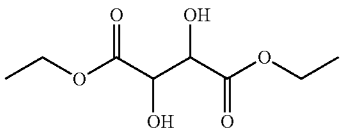

[Chemical Formula 2-3]

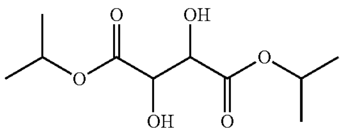

[Chemical Formula 2-4]

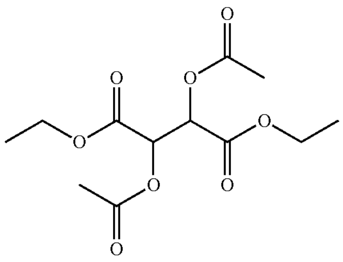

The compound represented by Chemical Formula 2A may include a compound represented by any one of Chemical Formula 2A-1 to Chemical Formula 2A-4.

[Chemical Formula 2A-1]

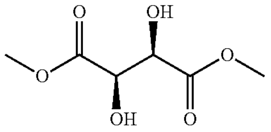

[Chemical Formula 2A-2]

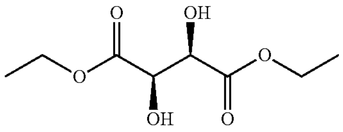

[Chemical Formula 2A-3]

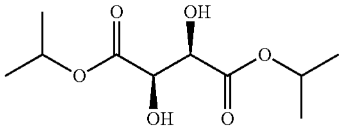

[Chemical Formula 2A-4]

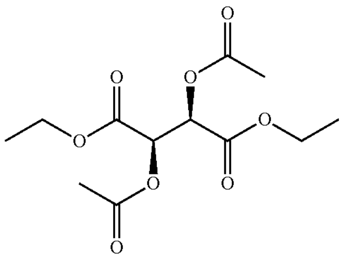

The first solvent and the second solvent may be mixed in a weight ratio of 1:1 to 3:1. For example, when the mixed solvent is composed of the first solvent and the second solvent, the first solvent and the second solvent may be mixed in a weight ratio of 1:1 to 3:1.

The mixed solvent may further include a third solvent including a compound represented by Chemical Formula 3.

[Chemical Formula 3]

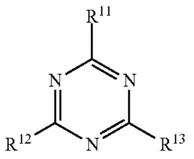

In Chemical Formula 3, $R^{11}$ to $R^{13}$ are each independently a substituted or unsubstituted C1 to C20 alkoxy group.

In Chemical Formula 3, $R^{11}$ to $R^{13}$ may each independently be a C1 to C20 alkoxy group that is substituted or unsubstituted with C2 to C10 alkenyl group.

The first solvent may be included in an amount of 100 parts by weight to 1600 parts by weight based on 100 parts by weight of the second solvent, and the third solvent may be included in an amount of 50 parts by weight to 900 parts by weight based on 100 parts by weight of the second solvent.

The mixed solvent may be composed of the first solvent, the second solvent, and the third solvent, wherein a sum of the amounts of the first solvent and the second solvent may be greater than the amount of the third solvent and a sum of the amounts of the first solvent and the third solvent may be greater than the amount of the second solvent.

The mixed solvent may be composed of the first solvent, the second solvent, and the third solvent, wherein a sum of the amounts of the second solvent and the third solvent may be greater than the amount of the first solvent.

The mixed solvent may be composed of the first solvent, the second solvent, and the third solvent, wherein a sum of the amounts of the second solvent and the third solvent may be less than the amount of the first solvent.

The semiconductor nanorods may have a diameter of 300 nm to 900 nm.

The semiconductor nanorods may have a length of 3.5 μm to 5 μm.

The semiconductor nanorods may include a GaN-based compound, an InGaN-based compound, or a combination thereof.

The semiconductor nanorods may have a surface coated with a metal oxide.

The metal oxide may include alumina, silica, or a combination thereof.

The semiconductor nanorods may be included in an amount of 0.01 wt % to 10 wt % based on the total amount of the ink composition.

The ink composition may further include malonic acid; 3-amino-1,2-propanediol; a silane-based coupling agent; a leveling agent; a fluorine-based surfactant; or a combination thereof.

The ink composition may be an ink composition for an electrophoresis device.

Another embodiment provides a layer manufactured using the ink composition.

Another embodiment provides an electrophoresis device including the layer.

Another embodiment provides a display device including the layer.

Other embodiments of the present invention are included in the following detailed description.

Advantageous Effects

The ink composition including the semiconductor nanorods according to the embodiment may be a curable composition having excellent dielectrophoretic properties and storage stability.

DESCRIPTION OF DRAWINGS

FIG. 1 is an example of a cross-sectional view of a semiconductor nanorod used in a curable composition according to an embodiment.

BEST MODE

Hereinafter, embodiments of the present invention are described in detail. However, these embodiments are exemplary, the present invention is not limited thereto and the present invention is defined by the scope of claims.

As used herein, when specific definition is not otherwise provided, "alkyl group" refers to a C1 to C20 alkyl group, "alkenyl group" refers to a C2 to C20 alkenyl group, "cycloalkenyl group" refers to a C3 to C20 cycloalkenyl group, "heterocycloalkenyl group" refers to a C3 to C20 heterocycloalkenyl group, "aryl group" refers to a C6 to C20 aryl group, "arylalkyl group" refers to a C6 to C20 arylalkyl group, "alkylene group" refers to a C1 to C20 alkylene group, "arylene group" refers to a C6 to C20 arylene group, "alkylarylene group" refers to a C6 to C20 alkylarylene group, "heteroarylene group" refers to a C3 to C20 heteroarylene group, and "alkoxylene group" refers to a C1 to C20 alkoxylene group.

As used herein, when specific definition is not otherwise provided, "substituted" refers to replacement of at least one hydrogen by a halogen atom (F, Cl, Br, or I), a hydroxy group, a C1 to C20 alkoxy group, a nitro group, a cyano group, an amine group, an imino group, an azido group, an amidino group, a hydrazino group, a hydrazono group, a carbonyl group, a carbamyl group, a thiol group, an ester group, an ether group, a carboxyl group or a salt thereof, a sulfonic acid group or a salt thereof, a phosphoric acid group or a salt thereof, a C1 to C20 alkyl group, a C2 to C20 alkenyl group, a C2 to C20 alkynyl group, a C6 to C20 aryl group, a C3 to C20 cycloalkyl group, a C3 to C20 cycloalkenyl group, a C3 to C20 cycloalkynyl group, a C2 to C20 heterocycloalkyl group, a C2 to C20 heterocycloalkenyl group, a C2 to C20 heterocycloalkynyl group, a C3 to C20 heteroaryl group, or a combination thereof.

As used herein, when specific definition is not otherwise provided, "hetero" refers to one including at least one heteroatom selected from N, O, S and P in a chemical formula.

As used herein, when specific definition is not otherwise provided, "(meth)acrylate" refers to both "acrylate" and "methacrylate", and "(meth)acrylic" refers to "acrylic" and "methacrylic."

As used herein, when specific definition is not otherwise provided, the term "combination" refers to mixing or copolymerization.

As used herein, unless a specific definition is otherwise provided, a hydrogen atom is boned at the position when a chemical bond is not drawn where supposed to be given.

As used herein, "semiconductor nanorod" refers to a rod-shaped semiconductor having a nano-sized diameter.

As used herein, when specific definition is not otherwise provided, "*" indicates a point where the same or different atom or chemical formula is linked.

An ink composition according to an embodiment includes (A) semiconductor nanorods; and (B) a mixed solvent including a first solvent including a compound represented by Chemical Formula 1 and a second solvent including a compound represented by Chemical Formula 2.

[Chemical Formula 1]

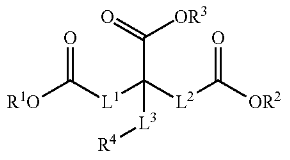

In Chemical Formula 1, $R^1$ to $R^3$ are each independently a hydrogen atom or a C1 to C10 alkyl group, $R^4$ is a hydrogen atom or *—C(=O)$R^5$, wherein $R^5$ is a C1 to C10 alkyl group, $L^1$ and $L^2$ are each independently a substituted or unsubstituted C1 to C20 alkylene group or a substituted or unsubstituted C6 to C20 arylene group, and $L^3$ is *—O—*, *—S—*, or *—NH—*,

[Chemical Formula 2]

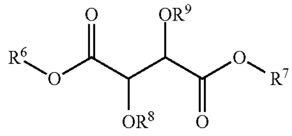

wherein, in Chemical Formula 2, $R^6$ and $R^7$ are each independently a hydrogen atom, a substituted or unsubstituted C1 to C20 alkyl group, a substituted or unsubstituted C3 to C20 cycloalkyl group, or a substituted or unsubstituted C6 to C20 aryl group, and $R^8$ and $R^9$ are each independently a hydrogen atom or *—(C═O)$R^{10}$, wherein $R^{10}$ is a substituted or unsubstituted C1 to C20 alkyl group, a substituted or unsubstituted C3 to C20 cycloalkyl group, or a substituted or unsubstituted C6 to C20 aryl group.

Recently, studies on various concepts having effects of improving energy efficiency and preventing efficiency drop of conventional LEDs such as micro LED, mini LED, and the like have been actively conducted. Among them, an alignment (electrophoresis) of InGaN-based nanorod LEDs using an electric field draws attentions as a method of dramatically reducing complex and expensive process costs of the micro LED, the mini LED, and the like.

However, organic solvents (PGMEA, GBL, PGME, ethyl acetate, IPA, and the like) conventionally used in a display and an electronic material have low viscosity and thus inorganic nanorod particles having high density may be sedimented too fast and thus agglomerated, and in addition, may be fast volatilized and thus may deteriorate alignment characteristics during the solvent drying after the dielectrophoresis. Accordingly, in order to develop an ink composition including the inorganic material nanorods (semiconductor nanorods), a solvent with excellent dielectrophoretic properties due to high viscosity and low dielectric constant and electrical conductivity is required to improve sedimentation stability of the nanorods, and the inventors of the present invention, after numerous trials and errors, have significantly improved dielectrophoretic properties of the semiconductor nanorods in the ink composition as well as maintained ink jetting properties of the ink composition and also, realized excellent storage stability by mixing compounds having specific structures as the solvent used with the semiconductor nanorods.

Hereinafter, each component is described in detail.

(A) Semiconductor Nanorods

The semiconductor nanorods may include a GaN-based compound, an InGaN-based compound, or a combination thereof, and the surface thereof may be coated with a metal oxide.

In order to secure dispersion stability of a semiconductor nanorod ink solution (semiconductor nanorods+solvent), it usually takes 3 hours, which is insufficient time to perform a large area inkjet process. Accordingly, the inventors of the present invention have developed an insulating film ($Al_2O_3$ or $SiO_x$) by coating a metal oxide such as alumina, silica, or a combination thereof on the surface of a semiconductor nanorod after numerous trial and error studies to maximize compatibility with a solvent described below.

For example, the insulating film coated with the metal oxide may have a thickness of 40 nm to 60 nm.

The semiconductor nanorods include an n-type confinement layer and a p-type confinement layer, and a multi quantum well (MQW) active region active region may be disposed between the n-type confinement layer and the p-type confinement layer.

For example, the semiconductor nanorods may have a diameter of 300 nm to 900 nm, for example, 600 nm to 700 nm.

For example, the semiconductor nanorods may have a length of 3.5 μm to 5 μm.

For example, when the semiconductor nanorods may include an alumina insulating layer, it may have a density of 5 $g/cm^3$ to 6 $g/cm^3$.

For example, the semiconductor nanorods may have a mass of $1\times10^{-13}$ g to $1\times10^{-11}$ g.

When the semiconductor nanorods have the above diameter, length, density and type, the surface coating of the metal oxide may be easily performed, so that dispersion stability of the semiconductor nanorods may be maximized.

The semiconductor nanorods may be included in an amount of 0.01 wt % to 10 wt %, for example 0.01 wt % to 5 wt % based on the total amount of the ink composition. Alternatively, the semiconductor nanorods may be included in an amount of 0.01 parts by weight to 0.5 parts by weight, for example, 0.01 parts by weight to 0.1 parts by weight, based on 100 parts by weight of the solvent in the ink composition. When the semiconductor nanorods are included within the above range, dispersibility in the ink is good, and the prepared pattern may have excellent luminance.

(B) Solvent

The ink composition according to an embodiment includes a mixed solvent including a first solvent including the compound represented by Chemical Formula 1 and a second solvent including the compound represented by Chemical Formula 2.

In recent years, as the needs for nano-scale micro LED devices are increasing, there has been an attempt to manufacture a nano-scale GaN-based or InGaN-based compound semiconductor as a rod, but a nanorod itself has a problem that dispersion stability in a solvent (or a polymerizable compound) is greatly deteriorated. Until now, there has been no introduction of a technology of improving the dispersion stability of the semiconductor nanorods in a solvent.

In order to secure high viscosity/high dielectric constant of an ink composition for inkjet, a compound such as 2,4-diethyl-1,5-pentanediol, 2-ethyl-1,3-hexanediol, or the like is generally used as a solvent, but these solvents exhibit deteriorated compatibility with a citrate-based solvent or a triazine-based solvent and thus have problems of deteriorating low temperature storage stability and generating precipitates when prepared into a mixed solvent for the ink composition. Accordingly, the present inventors have solved the problems by including a compound represented by Chemical Formula 2 in the mixed solvent to greatly improve the compatibility with the citrate-based solvent and the triazine-based solvent and also have improved dielectrophoretic properties as well as low temperature storage stability.

For example, Chemical Formula 2 may be represented by Chemical Formula 2A.

[Chemical Formula 2A]

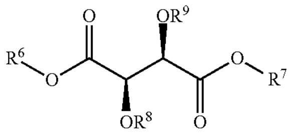

In Chemical Formula 2A, $R^6$ and $R^7$ are each independently a hydrogen atom, a substituted or unsubstituted C1 to C20 alkyl group, a substituted or unsubstituted C3 to C20 cycloalkyl group, or a substituted or unsubstituted C6 to C20 aryl group, and $R^8$ and $R^9$ are each independently a hydrogen atom or $*-(C{=}O)R^{10}$, wherein $R^{10}$ is a substituted or unsubstituted C1 to C20 alkyl group, a substituted or unsubstituted C3 to C20 cycloalkyl group, or a substituted or unsubstituted C6 to C20 aryl group.

For example, in Chemical Formula 2 and/or Chemical Formula 2A, $R^8$ and $R^9$ may each independently be a hydrogen atom. In this case, the compatibility of the second solvent with the first solvent and a third solvent to be described later may be further improved.

For example, in Chemical Formula 2 and/or Chemical Formula 2A, $R^6$ and $R^7$ may each independently be a hydrogen atom. In this case, the compatibility of the second solvent with the first solvent and a third solvent to be described later may be further improved.

For example, in Chemical Formula 2 and/or Chemical Formula 2A, $R^6$ to $R^9$ may each independently be a hydrogen atom. In this case, compatibility of the second solvent with the first solvent and a third solvent to be described later may be maximized.

The compound represented by Chemical Formula 2 may include a compound represented by any one of Chemical Formula 2-1 to Chemical Formula 2-4, but is not necessarily limited thereto.

[Chemical Formula 2-1]

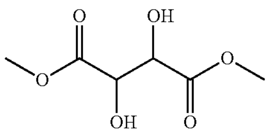

[Chemical Formula 2-2]

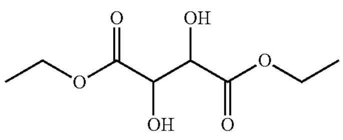

[Chemical Formula 2-3]

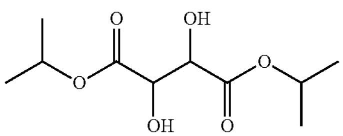

-continued

[Chemical Formula 2-4]

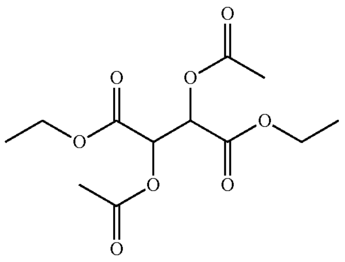

For example, the compound represented by Chemical Formula 2A may include a compound represented by any one of Chemical Formula 2A-1 to Chemical Formula 2A-4, but is not necessarily limited thereto.

[Chemical Formula 2A-1]

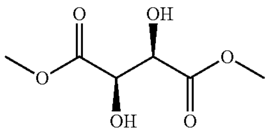

[Chemical Formula 2A-2]

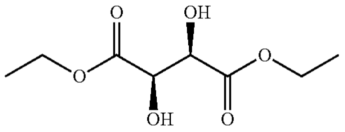

[Chemical Formula 2A-3]

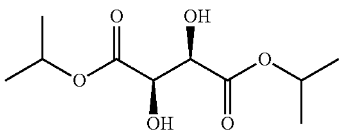

[Chemical Formula 2A-4]

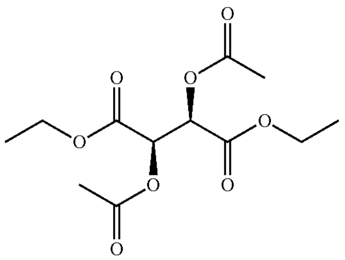

For example, the first solvent and the second solvent may be mixed in a weight ratio of 1:1 to 3:1. For example, when the mixed solvent is composed of the first solvent and the second solvent, the first solvent and the second solvent may be mixed in a weight ratio of 1:1 to 3:1. When the mixed solvent is composed of the first solvent and the second solvent, if the mixing weight ratio between the first solvent and the second solvent is controlled within the above range, compatibility between the first solvent and the second solvent may be further improved.

The mixed solvent may further include a third solvent including a compound represented by Chemical Formula 3.

[Chemical Formula 3]

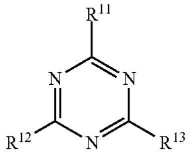

In Chemical Formula 3, $R^{11}$ to $R^{13}$ are each independently a substituted or unsubstituted C1 to C20 alkoxy group.

For example, in Chemical Formula 3, $R^{11}$ to $R^{13}$ may each independently be a C1 to C20 alkoxy group that is substituted or unsubstituted with a C2 to C10 alkenyl group (e.g., a vinyl group, etc.).

When the mixed solvent in the ink composition according to an embodiment further includes the third solvent in addition to the first solvent and the second solvent, compatibility between solvents having different structures may further improved, and thus storage stability at low temperature may be maximized.

For example, the compound represented by Chemical Formula 3 may include at least one selected from compounds represented by Chemical Formula 3-1 and Chemical Formula 3-2, but is not necessarily limited thereto.

[Chemical Formula 3-1]

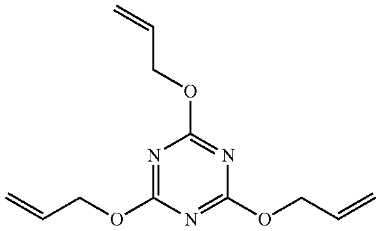

[Chemical Formula 3-2]

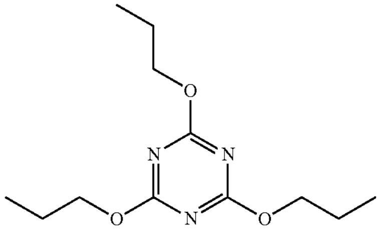

For example, when the mixed solvent is composed of the first solvent, the second solvent, and the third solvent, the first solvent may be included in an amount of 100 parts by weight to 1600 parts by weight based on 100 parts by weight of the second solvent, and the third solvent may be included in an amount of 50 parts by weight to 900 parts by weight based on 100 parts by weight of the second solvent.

For example, when the mixed solvent is composed of the first solvent, the second solvent, and the third solvent, a sum of the amounts of the first solvent and the second solvent may be greater than the amount of the third solvent, and a sum of the amounts of the first solvent and the third solvent may be greater than the amount of the second solvent.

For example, when the mixed solvent is composed of the first solvent, the second solvent, and the third solvent, a sum of the amounts of the second solvent and the third solvent may be greater than the amount of the first solvent.

For example, when the mixed solvent is composed of the first solvent, the second solvent, and the third solvent, a sum of the amounts of the second solvent and the third solvent may be less than the amount of the first solvent.

For example, the mixed solvent may further include a compound represented by Chemical Formula 4.

[Chemical Formula 4]

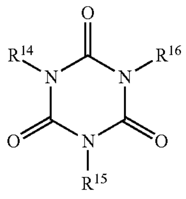

In Chemical Formula 4, $R^{14}$ to $R^{16}$ are each independently a substituted or unsubstituted C1 to C20 alkyl group.

For example, in Chemical Formula 4, $R^3$ to $R^5$ may each independently be a C1 to C20 alkyl group that is unsubstituted or substituted with a C2 to C10 alkenyl group (e.g., a vinyl group, etc.).

For example, the compound represented by Chemical Formula 4 may include at least one selected from compounds represented by Chemical Formula 4-1 and Chemical Formula 4-2, but is not necessarily limited thereto.

[Chemical Formula 4-1]

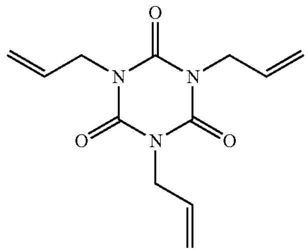

[Chemical Formula 4-2]

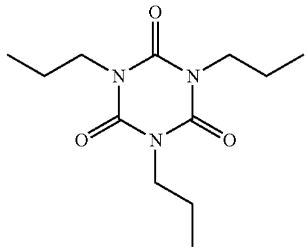

Meanwhile, the compound represented by Chemical Formula 1 may be represented by any one of Chemical Formula 1-1 to Chemical Formula 1-6, but is not necessarily limited thereto.

[Chemical Formula 1-1]

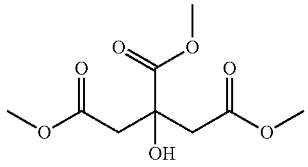

-continued

[Chemical Formula 1-2]

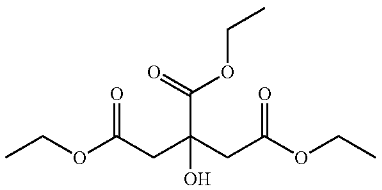

[Chemical Formula 1-3]

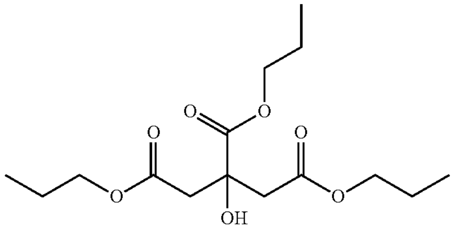

[Chemical Formula 1-4]

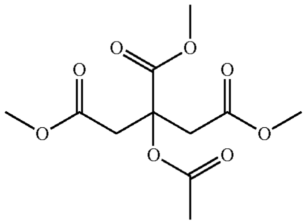

[Chemical Formula 1-5]

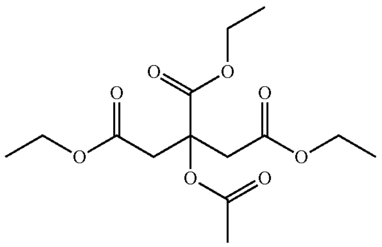

[Chemical Formula 1-6]

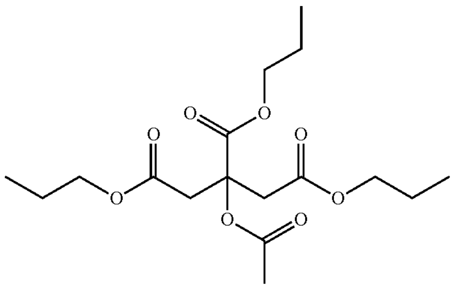

The solvent may be included in an amount of 20 wt % to 99.99 wt %, for example 20 wt % to 99.7 wt %, for example 20 wt % to 95 wt %, for example 30 wt % to 90 wt %, based on the total amount of the ink composition.

Polymerizable Monomer

The ink composition according to the embodiment may further include a polymerizable compound as needed. The polymerizable compound may be used by mixing monomers or oligomers that are generally used in conventional curable compositions.

For example, the polymerizable compound may be a polymerizable monomer having a carbon-carbon double bond at the terminal end.

For example, the polymerizable compound may be a polymerizable monomer having at least one of the functional group represented by Chemical Formula A-1 or the functional group represented by Chemical Formula A-2 at the terminal end.

[Chemical Formula A-1]

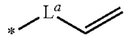

[Chemical Formula A-2]

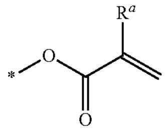

In Chemical Formula A-1 and Chemical Formula A-2, $L^a$ is a substituted or unsubstituted C1 to C20 alkylene group, and $R^a$ is a hydrogen atom or a substituted or unsubstituted C1 to C20 alkyl group.

The polymerizable compound may form a crosslinked structure with the surface-modified compound by including at least one carbon-carbon double bond, specifically the functional group represented by Chemical Formula A-1 or the functional group represented by Chemical Formula A-2. The product having the crosslinked structure may further improve dispersion stability of the semiconductor nanorods by doubling a type of steric hindrance effect.

For example, examples of the polymerizable compound including at least one functional group represented by Chemical Formula A-1 at the terminal end may include divinyl benzene, triallyl cyanurate, triallyl isocyanurate, triallyl trimellitate, triallyl phosphate, triallyl phosphite, triallyl triazine, diallyl phthalate, or a combination thereof, but is not necessarily limited thereto.

For example, the polymerizable compound including at least one functional group represented by Chemical Formula A-2 at the terminal end may include ethylene glycol diacrylate, triethylene glycoldiacrylate, 1,4-butanedioldiacrylate, 1,6-hexanedioldiacrylate, neopentylglycoldiacrylate, pentaerythritoldiacrylate, pentaerythritoltriacrylate, dipentaerythritoldiacrylate, dipentaerythritoltriacrylate, dipentaerythritolpentaacrylate, pentaerythritolhexaacrylate, bisphenol A diacrylate, trimethylolpropanetriacrylate, novolacepoxyacrylate, ethylene glycoldimethacrylate, diethylene glycoldimethacrylate, triethylene glycoldimethacrylate, propylene glycoldimethacrylate, 1,4-butanedioldimethacrylate, 1,6-hexanedioldimethacrylate, multi-functional epoxy(meth) acrylate, multi-functional urethane (meth)acrylate, KAYARAD DPCA-20, KAYARAD DPCA-30, KAYARAD DPCA-60, KAYARAD DPCA-120, KAYARAD DPEA-12, or a combination thereof manufactured by Japan Chemical Co., Ltd., but is not necessarily limited thereto.

The polymerizable compound may be treated with an acid anhydride in order to impart more excellent developability.

Polymerization Initiator

The curable composition according to the embodiment may further include a polymerization initiator, for example, a photopolymerization initiator, a thermal polymerization initiator, or a combination thereof, as needed.

The photopolymerization initiator may be an initiator generally used in curable compositions, for example, an acetophenone-based compound, a benzophenone-based compound, a thioxanthone-based compound, a benzoin-based compound, a triazine-based compound, an oxime-based compound, and an aminoketone-based compound, but is not necessarily limited thereto.

Examples of the acetophenone-based compound may be 2,2'-diethoxy acetophenone, 2,2'-dibutoxy acetophenone, 2-hydroxy-2-methylpropinophenone, p-t-butyltrichloro acetophenone, p-t-butyldichloro acetophenone, 4-chloro acetophenone, 2,2'-dichloro-4-phenoxy acetophenone, 2-methyl-1-(4-(methylthio)phenyl)-2-morpholinopropan-1-one, 2-benzyl-2-dimethylamino-1-(4-morpholinophenyl)-butan-1-one, and the like.

Examples of the benzophenone-based compound may include benzophenone, benzoyl benzoate, benzoyl methyl benzoate, 4-phenyl benzophenone, hydroxybenzophenone, acrylated benzophenone, 4,4'-bis(dimethyl amino)benzophenone, 4,4'-bis(diethylamino)benzophenone, 4,4'-dimethylaminobenzophenone, 4,4'-dichlorobenzophenone, 3,3'-dimethyl-2-methoxybenzophenone, and the like.

Examples of the thioxanthone-based compound may be thioxanthone, 2-methylthioxanthone, isopropyl thioxanthone, 2,4-diethyl thioxanthone, 2,4-diisopropyl thioxanthone, 2-chlorothioxanthone, and the like.

Examples of the benzoin-based compound may be benzoin, benzoin methyl ether, benzoin ethyl ether, benzoin isopropyl ether, benzoin isobutyl ether, benzyldimethylketal, and the like.

Examples of the triazine-based compound may be 2,4,6-trichloro-s-triazine, 2-phenyl-4,6-bis(trichloromethyl)-s-triazine, 2-(3',4'-dimethoxystyryl)-4,6-bis(trichloromethyl)-s-triazine, 2-(4'-methoxynaphthyl)-4,6-bis(trichloromethyl)-s-triazine, 2-(p-methoxyphenyl)-4,6-bis(trichloromethyl)-s-triazine, 2-(p-tolyl)-4,6-bis(trichloromethyl)-s-triazine, 2-biphenyl-4,6-bis(trichloro methyl)-s-triazine, bis(trichloromethyl)-6-styryl-s-triazine, 2-(naphtha-1-yl)-4,6-bis(trichloromethyl)-s-triazine, 2-(4-methoxynaphtho-1-yl)-4,6-bis(trichloromethyl)-s-triazine, 2-4-bis(trichloromethyl)-6-piperonyl-s-triazine, 2-4-bis(trichloromethyl)-6-(4-methoxystyryl)-s-triazine, and the like.

Examples of the oxime compound may include an O-acyloxime compound, 2-(O-benzoyloxime)-1-[4-(phenylthio)phenyl]-1,2-octanedione, 1-(O-acetyloxime)-1-[9-ethyl-6-(2-methylbenzoyl)-9H-carbazol-3-yl]ethanone, O-ethoxycarbonyl-α-oxyamino-1-phenylpropan-1-one, and the like. Specific examples of the O-acyloxime-based compound may include 1,2-octanedione, 2-dimethylamino-2-(4-methylbenzyl)-1-(4-morpholin-4-yl-phenyl)-butane-1-one, 1-(4-phenylsulfanylphenyl)-butane-1,2-dione-2-oxime-O-benzoate, 1-(4-phenylsulfanylphenyl)-octane-1,2-dione-2-oxime-O-benzoate, 1-(4-phenylsulfanylphenyl)-octan-1-oneoxime-O-acetate, 1-(4-phenylsulfanylphenyl)-butan-1-oneoxime-O-acetate, and the like.

Examples of the aminoketone-based compound may include 2-benzyl-2-dimethylamino-1-(4-morpholinophenyl)-butanone-1.

The photopolymerization initiator may further include a carbazole-based compound, a diketone-based compound, a sulfonium borate-based compound, a diazo-based compound, an imidazole-based compound, a biimidazole-based compound, and the like, besides the compounds.

The photopolymerization initiator may be used with a photosensitizer capable of causing a chemical reaction by absorbing light and becoming excited and then, transferring its energy.

Examples of the photosensitizer may be tetraethylene glycol bis-3-mercapto propionate, pentaerythritol tetrakis-3-mercapto propionate, dipentaerythritol tetrakis-3-mercapto propionate, and the like.

Examples of the thermal polymerization initiator may be peroxide, specifically, benzoyl peroxide, dibenzoyl peroxide, lauryl peroxide, dilauryl peroxide, di-tert-butyl peroxide, cyclohexane peroxide, methyl ethyl ketone peroxide, hydroperoxide (e.g., tert-butyl hydroperoxide, cumene hydroperoxide), dicyclohexyl peroxydicarbonate, 2,2-azobis(isobutyronitrile), t-butyl perbenzoate, and the like and also, 2,2'-azobis-2-methylpropinonitrile and the like, but are not necessarily limited thereto and may include anything widely known in the related field.

The polymerization initiator may be included in an amount of 1 wt % to 5 wt %, for example 2 wt % to 4 wt % based on the total solid amount of the ink composition. When the polymerization initiator is included within the ranges, the ink composition may be sufficiently cured during the exposure or thermal curing and thus obtain excellent reliability.

Other Additives

The ink composition according to an embodiment may further include a polymerization inhibitor including a hydroquinone-based compound, a catechol-based compound, or a combination thereof, as needed. As the ink composition according to an embodiment further includes the hydroquinone-based compound, catechol-based compound, or combination thereof, after printing (coating) an ink composition, crosslinking at room temperature may be prevented during exposure.

For example, the hydroquinone-based compound, catechol-based compound, or combination thereof may include hydroquinone, methyl hydroquinone, methoxyhydroquinone, t-butyl hydroquinone, 2,5-di-t-butyl hydroquinone, 2,5-bis(1,1-dimethylbutyl) hydroquinone, 2,5-bis(1,1,3,3-tetramethylbutyl) hydroquinone, catechol, t-butyl catechol, 4-methoxyphenol, pyrogallol, 2,6-di-t-butyl-4-methylphenol, 2-naphthol, tris(N-hydroxy-N-nitrosophenylaminato-O,O') aluminium, or a combination thereof, but is not necessarily limited thereto.

The hydroquinone-based compound, catechol-based compound, or combination thereof may be used in a dispersion type and the dispersion-type polymerization inhibitor may be included in an amount of 0.001 wt % to 1 wt %, for example 0.01 wt % to 0.1 wt %, based on the total amount of the ink composition. When the stabilizer is included within the above range, the problem with aging at room temperature may be solved and sensitivity reduction and surface peeling may be prevented.

The ink composition according to an embodiment may further include malonic acid; 3-amino-1,2-propanediol; a silane-based coupling agent; a leveling agent; a fluorine-based surfactant; or a combination thereof in addition to the polymerization inhibitor, as needed.

For example, the ink composition may further include a silane-based coupling agent having a reactive substituent such as a carboxyl group, a methacryloyl group, an isocyanate group, an epoxy group, and the like to improve its close contacting property with a substrate.

Examples of the silane-based coupling agent may include trimethoxysilyl benzoic acid, γ-methacryl oxypropyl trimethoxysilane, vinyl triacetoxysilane, vinyl trimethoxysilane, γ-isocyanate propyl triethoxysilane, γ-glycidoxy propyl trimethoxysilane, β-epoxycyclohexypethyl trimethoxysilane, and the like. These may be used alone or in a mixture of two or more.

The silane-based coupling agent may be included in an amount of 0.01 parts by weight to 10 parts by weight based on 100 parts by weight of the ink composition. When the silane-coupling agent is included within the range, a close contacting property, a storing property, and the like may be improved.

In addition, the ink composition may further include a surfactant, for example a fluorine-based surfactant to improve coating and prevent a defect if necessary.

Examples of the fluorine-based surfactant may be BM-1000® and BM-1100® of BM Chemie Inc.; MEGA-FACE F 142D®, MEGAFACE F 172®, MEGAFACE F 173®, and MEGAFACE F 183® of Dainippon Ink Kagaku Kogyo Co., Ltd.; FULORAD FC-135®, FULORAD FC-170C®, FULORAD FC-430®, and FULORAD FC-431® of Sumitomo 3M Co., Ltd.; SURFLON S-112®, SURFLON S-113®, SURFLON S-131®, SURFLON S-141®, and SURFLON S-145® of ASAHI Glass Co., Ltd.; and SH-28PA®, SH-190®, SH-193®, SZ-6032®, and SF-8428®, and the like of Toray Silicone Co., Ltd.; F-482, F-484, F-478, F-554, and the like of DIC Co., Ltd.

The fluorine-based surfactant may be included in an amount of 0.001 parts by weight to 5 parts by weight based on 100 parts by weight of the ink composition. When the fluorine-based surfactant is included within the above range, excellent wetting on a glass substrate as well as coating uniformity may be secured, and a stain may not be produced.

In addition, a certain amount of other additives such as antioxidants and stabilizers may be further added to the ink composition within a range that does not impair physical properties.

Binder Resin

The ink composition may further include a binder resin.

The binder resin may include an acryl-based binder resin, a cardo-based binder resin, or a combination thereof.

The acryl-based binder resin and cardo-based binder resin may be any known resin commonly used in a curable composition or a photosensitive composition, and the binder resin is not limited to a specific type.

The binder resin may be included in an amount of 1 wt % to 30 wt %, for example, 1 wt % to 20 wt % based on the total amount of an ink composition. When the binder resin is included within the above range, a curing shrinkage rate may be lowered.

Another embodiment provides a layer using the ink composition. Another embodiment may provide an electrophoresis device and/or a display device including the layer.

MODE FOR INVENTION

Hereinafter, the present invention is illustrated in more detail with reference to examples. These examples, however, are not in any sense to be interpreted as limiting the scope of the invention.

Preparation of Ink Composition

EXAMPLES 1 TO 8 AND COMPARATIVE EXAMPLES 1 AND 2

A nanorod-patterned GaN wafer (4 inches) was reacted in 40 ml of stearic acid (1.5 mM) at room temperature for 24 hours. After the reaction, the nanorod-patterned GaN was dipped in 50 ml of acetone for 5 minutes to remove an excessive amount of the stearic acid, and additionally, 40 ml of acetone was used to rinse the surface of the wafer. The washed wafer was placed with 35 ml of γ-butyrolactone (GBL) in a 27 kW bath-type sonicator and then, sonicated for 5 minutes to separate the rods from the wafer surface. The separated rods were placed in a FALCON tube for a centrifuge, and 10 ml of GBL was added thereto to additionally wash the rods on the surface of the bath. Then, a supernatant was discarded therefrom through centrifugation at 4000 rpm for 10 minutes, and precipitates therein were redispersed in 40 ml of acetone and filtered with a 10 μm mesh filter. After additional centrifugation (4000 rpm, 10 minutes), the precipitate was dried in a drying oven (100° C. for 1 hour), the weight was measured, and the corresponding nanorods were dispersed in each mixed solvent so as to be 0.2 w/w % to obtain each ink composition having compositions shown in Table 1.

(Each Mixed Solvent Composition is the Same as in Table 2.)

TABLE 1

| (unit: wt %) | Amount |
|---|---|
| (A) GaN nanorods | 0.2 |
| (B) Mixed solvent | 99.8 |

TABLE 2

| | Solvent composition (wt %) | | | | | | |
|---|---|---|---|---|---|---|---|
| | Chemical Formula 1-2 | Chemical Formula 2A-1 | Chemical Formula 2A-2 | Chemical Formula 2A-3 | Chemical Formula 2A-4 | Chemical Formula 4-1 | 2,4-diethyl-1,5-pentanediol |
| Example 1 | 63 | 37 | — | — | — | — | — |
| Example 2 | 52 | — | 48 | — | — | — | — |
| Example 3 | 57 | — | — | 43 | — | — | — |
| Example 4 | 63 | — | — | — | 4 | 33 | — |
| Example 5 | 36 | — | 21 | — | — | 43 | — |
| Example 6 | 44 | — | — | 31 | — | 25 | — |
| Example 7 | 44 | — | — | 34 | — | 22 | — |
| Example 8 | 44 | — | — | 37 | — | 19 | — |
| Comparative Example 1 | 56 | — | — | — | — | — | 44 |
| Comparative Example 2 | 32.5 | — | — | — | — | 31 | 36.5 |

Evaluation 1: Storage Stability

The pure mixed solvents according to Examples 1 to 8 and Comparative Examples 1 and 2 were evaluated with respect to storage stability, and the results are shown in Table 3. Specifically, each mixed solvent was allowed to stand for 4 hours for each temperature and then, observed with naked eyes to check changes in morphology (phase separation of the solvent), and in addition, each sample was taken by 1 ml from the top and then, examined with respect to changes in a composition ratio (changes in solvent area %) compared to an initial solvent composition ratio through gas chromatography analysis and then, evaluated according to the following criteria.

(1) Change in Morphology

○: No phase separation

X: Phase separation phenomenon was observed (2) Change in Composition Ratio

○: Change in solvent composition ratio is less than 1%

X: Change in solvent composition ratio is greater than or equal to 1%

TABLE 3

| Storage temperature (° C.) | | 20 | 18 | 16 | 12 | 0 |
|---|---|---|---|---|---|---|
| Example 1 | Change in morphology | ○ | ○ | ○ | ○ | ○ |
| | Change in composition ratio | ○ | ○ | ○ | ○ | ○ |
| Example 2 | Change in morphology | ○ | ○ | ○ | ○ | ○ |
| | Change in composition ratio | ○ | ○ | ○ | ○ | ○ |
| Example 3 | Change in morphology | ○ | ○ | ○ | ○ | ○ |
| | Change in composition ratio | ○ | ○ | ○ | ○ | ○ |
| Example 4 | Change in morphology | ○ | ○ | ○ | ○ | ○ |
| | Change in composition ratio | ○ | ○ | ○ | ○ | ○ |
| Example 5 | Change in morphology | ○ | ○ | ○ | ○ | ○ |
| | Change in composition ratio | ○ | ○ | ○ | ○ | ○ |
| Example 6 | Change in morphology | ○ | ○ | ○ | ○ | ○ |
| | Change in composition ratio | ○ | ○ | ○ | ○ | ○ |
| Example 7 | Change in morphology | ○ | ○ | ○ | ○ | ○ |
| | Change in composition ratio | ○ | ○ | ○ | ○ | ○ |
| Example 8 | Change in morphology | ○ | ○ | ○ | ○ | ○ |
| | Change in composition ratio | ○ | ○ | ○ | ○ | ○ |
| Comparative Example 1 | Change in morphology | ○ | ○ | ○ | ○ | ○ |
| | Change in composition ratio | ○ | ○ | ○ | ○ | X |
| Comparative Example 2 | Change in morphology | ○ | ○ | X | X | X |
| | Change in composition ratio | ○ | ○ | ○ | X | X |

As shown in Table 3, Examples 1 to 8 exhibited excellent storage stability at a low temperature, compared with Comparative Examples 1 and 2.

Evaluation 2: Viscosity and Dielectrophoretic Properties

Each nanorod-containing ink composition according to Examples 1 to 8 and Comparative Examples 1 and 2 was measured with respect to initial viscosity at 25° C. by using a viscometer (RV-2 spindle, 23 rpm, Dy-II made by Brookfield Engineering Laboratories, Inc.), and the results are shown in Table 4. In addition, dielectrophoretic properties (deflection alignment, center alignment) of the ink compositions were respectively measured by using Turbiscan, and the results are shown in Table 4.

Specifically, the dielectrophoretic properties were measured in the following method.

First, 500 μl of each ink composition was applied on thin-film gold basic interdigitated linear electrodes (ED-cIDE4-Au, Micrux Technologies) and then, allowed to stand for 1 minute after applying an electric field (25 KHz, ±30 v) thereto. Subsequently, after drying the solvent by using a hot plate, the number of aligned particles (ea.) and the number of non-aligned particles (ea.) in the center between the electrodes were counted with a microscope to evaluate the dielectrophoretic properties.

TABLE 4

| | Ex. 1 | Ex. 2 | Ex. 3 | Ex. 4 | Ex. 5 | Ex. 6 | Ex. 7 | Ex. 8 | Comp. Ex. 1 | Comp. Ex. 2 |
|---|---|---|---|---|---|---|---|---|---|---|
| Viscosity (cps) | 67.5 | 66.9 | 67.0 | 66.1 | 66.7 | 67.2 | 167.8 | 68.1 | 67.3 | 66.3 |
| Deflection alignment (%) | 59 | 66 | 67 | 89 | 99 | 99 | 98 | 95 | 61 | 96 |
| Center alignment (%) | 79 | 81 | 82 | 83 | 86 | 88 | 89 | 88 | 72 | 74 |

As shown in Table 4, Examples 1 to 3 including a two-component solvent exhibited excellent dielectrophoretic properties, compared with Comparative Example 1 including the two-component solvent. In addition, Examples 4 to 8 including a three-component solvent exhibited excellent dielectrophoretic properties as well as maintained high viscosity at 25° C., compared with Comparative Example 2 including the three-component solvent. Accordingly, the ink composition according to an embodiment greatly improved dispersion stability of semiconductor nanorods and simultaneously, exhibited excellent dielectrophoretic properties and accordingly, turned out to be suitable for large-area coating and panel production.

While this invention has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims. Therefore, the aforementioned embodiments should be understood to be exemplary but not limiting the present invention in any way.

The invention claimed is:

1. An ink composition, comprising (A) semiconductor nanorods; and (B) a mixed solvent including a first solvent including a compound represented by Chemical Formula 1 and a second solvent including a compound represented by Chemical Formula 2:

[Chemical Formula 1]

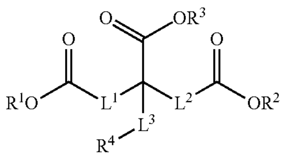

wherein, in Chemical Formula 1, $R^1$ to $R^3$ are each independently a hydrogen atom or a C1 to C10 alkyl group, $R^4$ is a hydrogen atom or *—C(═O) $R^5$, wherein $R^5$ is a C1 to C10 alkyl group, $L^1$ and $L^2$ are each independently a substituted or unsubstituted C1 to C20 alkylene group or a substituted or unsubstituted C6 to C20 arylene group, and $L^3$ is *—O—*, *—S—*, or *—NH—*,

[Chemical Formula 2]

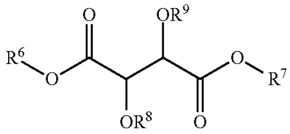

wherein, in Chemical Formula 2, $R^6$ and $R^7$ are each independently a hydrogen atom, a substituted or unsubstituted C1 to C20 alkyl group, a substituted or unsubstituted C3 to C20 cycloalkyl group, or a substituted or unsubstituted C6 to C20 aryl group, and $R^8$ and $R^9$ are each independently a hydrogen atom or *—(C═O) $R^{10}$, wherein $R^{10}$ is a substituted or unsubstituted C1 to C20 alkyl group, a substituted or unsubstituted C3 to C20 cycloalkyl group, or a substituted or unsubstituted C6 to C20 aryl group, and wherein the first solvent and the second solvent are mixed in a weight ratio of 1:1 to 3:1.

2. The ink composition of claim 1, wherein Chemical Formula 2 is represented by Chemical Formula 2A:

[Chemical Formula 2A]

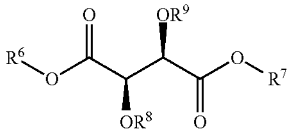

wherein, in Chemical Formula 2A, $R^6$ and $R^7$ are each independently a hydrogen atom, a substituted or unsubstituted C1 to C20 alkyl group, a substituted or unsubstituted C3 to C20 cycloalkyl group, or a substituted or unsubstituted C6 to C20 aryl group, and $R^8$ and $R^9$ are each independently a hydrogen atom or *—(C═O) $R^{10}$, wherein $R^{10}$ is a substituted or unsubstituted C1 to C20 alkyl group, a substituted or unsubstituted C3 to C20 cycloalkyl group, or a substituted or unsubstituted C6 to C20 aryl group.

3. The ink composition of claim 1, wherein $R^8$ and $R^9$ are each independently a hydrogen atom.

4. The ink composition of claim 1, wherein $R^6$ and $R^7$ are each independently a hydrogen atom.

5. The ink composition of claim 1, wherein the compound represented by Chemical Formula 2 comprises a compound represented by any one of Chemical Formula 2-1 to Chemical Formula 2-4:

[Chemical Formula 2-1]

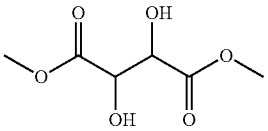

[Chemical Formula 2-2]

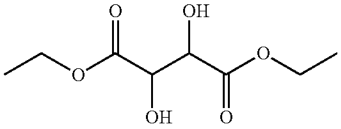

[Chemical Formula 2-3]

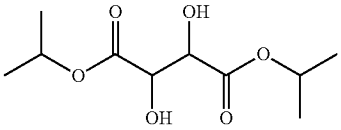

[Chemical Formula 2-4]

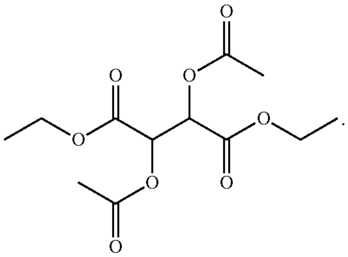

6. The ink composition of claim 1, wherein the mixed solvent further comprises a third solvent including a compound represented by Chemical Formula 3:

[Chemical Formula 3]

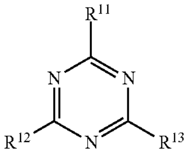

wherein, in Chemical Formula 3, $R^{11}$ to $R^{13}$ are each independently a substituted or unsubstituted C1 to C20 alkoxy group.

7. The ink composition of claim 6, wherein in Chemical Formula 3, $R^{11}$ to $R^{13}$ are each independently a C1 to C20 alkoxy group that is substituted or unsubstituted with a C2 to C10 alkenyl group.

8. The ink composition of claim 6, wherein the first solvent is included in an amount of 100 parts by weight to 1600 parts by weight based on 100 parts by weight of the second solvent, and the third solvent is included in an amount of 50 parts by weight to 900 parts by weight based on 100 parts by weight of the second solvent.

9. The ink composition of claim 6, wherein the mixed solvent is composed of the first solvent, the second solvent, and the third solvent, a sum of the amounts of the first solvent and the second solvent is greater than the amount of the third solvent, and a sum of the amounts of the first solvent and the third solvent is greater than the amount of the second solvent.

10. The ink composition of claim 1, wherein the semiconductor nanorods have a diameter of 300 nm to 900 nm.

11. The ink composition of claim 1, wherein the semiconductor nanorods have a length of 3.5 μm to 5 μm.

12. The ink composition of claim 1, wherein the semiconductor nanorods comprise a GaN-based compound, an InGaN-based compound, or a combination thereof.

13. The ink composition of claim 1, wherein the semiconductor nanorods have surfaces coated with a metal oxide.

14. The ink composition of claim 13, wherein the metal oxide comprises alumina, silica, or a combination thereof.

15. The ink composition of claim 1, wherein the semiconductor nanorods are included in an amount of 0.01 wt % to 10 wt % based on the total amount of the ink composition.

16. The ink composition of claim 1, wherein the ink composition further comprises malonic acid; 3-amino-1,2-propanediol; a silane-based coupling agent; a leveling agent; a fluorine-based surfactant; or a combination thereof.

17. The ink composition of claim 1, wherein the ink composition is an ink composition for an electrophoresis device.

* * * * *